US009807197B2

(12) United States Patent
Adisesha

(10) Patent No.: US 9,807,197 B2
(45) Date of Patent: Oct. 31, 2017

(54) REAL-TIME INTERACTION IN A COMMUNICATION NETWORK

(71) Applicant: Alcatel Lucent, Boulogne Billancourt (FR)

(72) Inventor: Naveen Adisesha, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 170 days.

(21) Appl. No.: 14/377,258

(22) PCT Filed: Jan. 30, 2013

(86) PCT No.: PCT/EP2013/051784
§ 371 (c)(1),
(2) Date: Aug. 7, 2014

(87) PCT Pub. No.: WO2013/117472
PCT Pub. Date: Aug. 15, 2013

(65) Prior Publication Data
US 2015/0341464 A1 Nov. 26, 2015

(30) Foreign Application Priority Data
Feb. 8, 2012 (EP) .................................. 12305136

(51) Int. Cl.
H04L 29/08 (2006.01)
(52) U.S. Cl.
CPC .............. H04L 67/32 (2013.01); H04L 67/22 (2013.01); H04L 67/30 (2013.01)
(58) Field of Classification Search
CPC .................................. H04L 67/32; H04L 67/22
(Continued)

(56) References Cited
U.S. PATENT DOCUMENTS

| 6,611,687 B1 * | 8/2003 | Clark ..................... H04W 4/02 340/990 |
| 7,184,755 B2 | 2/2007 | Fukushima |
| 7,620,980 B1 * | 11/2009 | Wood .................. H04L 63/0281 713/153 |
| 8,064,379 B2 * | 11/2011 | Huang .................... H04W 4/02 348/14.02 |

(Continued)

FOREIGN PATENT DOCUMENTS

| EP | 2 173 080 | 4/2010 |
| JP | 2001-273432 | 10/2001 |

(Continued)

OTHER PUBLICATIONS

"I'm feeling LoCo: A Location Based Context Aware Recommendation System"—Savage et al, University of California, Santa Barbara, National Autonomous University of Mexico, Jul. 2011 https://pdfs.semanticscholar.org/2ee1/de8018480726c73ddb827da-77d6058f37b52.pdf.*

(Continued)

Primary Examiner — Randy Scott
(74) Attorney, Agent, or Firm — Fay Sharpe, LLP

(57) ABSTRACT

A method for achieving real-time interaction is described herein. According to an implementation, the method includes determining a context feature associated with a request received from a requesting terminal (104). The request is transmitted in a service region based on the context feature. The request is transmitted by broadcasting the request over a communication network (108). In response to the request, at least one request response is received from one or more of a plurality of target terminals (106). Further, the request response is provided to the requesting terminal (104), based on the request.

7 Claims, 3 Drawing Sheets

(58) Field of Classification Search
USPC .................. 709/203, 204, 205, 206, 207
See application file for complete search history.

(56) References Cited

U.S. PATENT DOCUMENTS

| | | |
|---|---|---|
| 2003/0154211 A1 | 8/2003 | Kasahara |
| 2005/0174975 A1 | 8/2005 | Mgrdechian et al. |
| 2006/0075430 A1* | 4/2006 | Park .................. H04N 7/17318 725/42 |
| 2008/0090599 A1 | 4/2008 | Patel et al. |
| 2010/0030806 A1* | 2/2010 | Kuhlke ............ G06F 17/30781 707/732 |
| 2010/0280904 A1 | 11/2010 | Ahuja |
| 2012/0028607 A1* | 2/2012 | Tengler ................ H04L 63/126 455/411 |

FOREIGN PATENT DOCUMENTS

| | | |
|---|---|---|
| JP | 2002-297820 | 10/2002 |
| JP | 2003-242292 | 8/2003 |
| JP | 2003-345724 | 12/2003 |
| JP | 2004-320140 | 11/2004 |
| JP | 2005-227841 | 8/2005 |
| JP | 2007-122341 | 5/2007 |
| JP | 2007-228230 | 9/2007 |
| JP | 2010-217952 | 9/2010 |
| JP | 2011-151519 | 8/2011 |

OTHER PUBLICATIONS

International Search Report for PCT/EP2013/051784 dated Mar. 5, 2014.

* cited by examiner

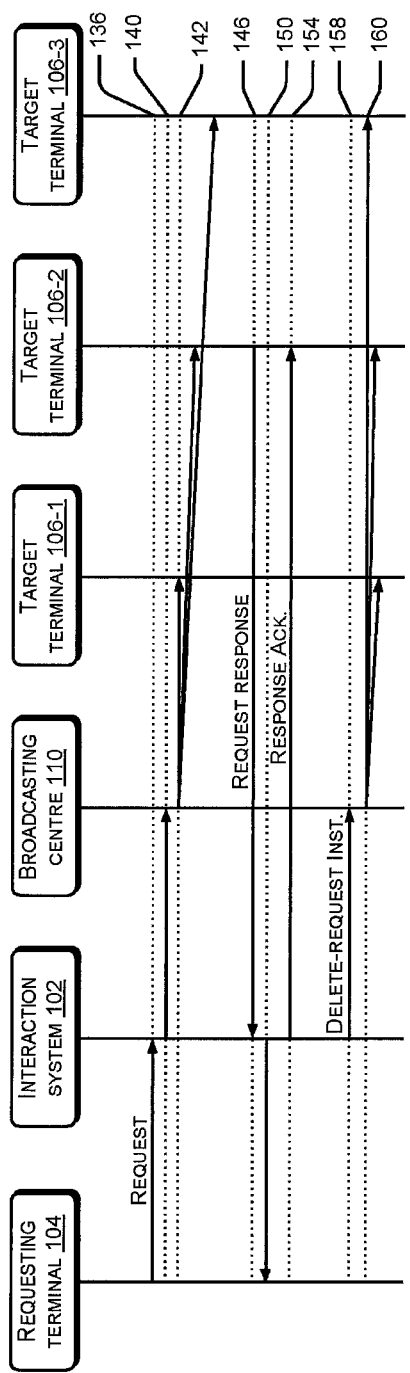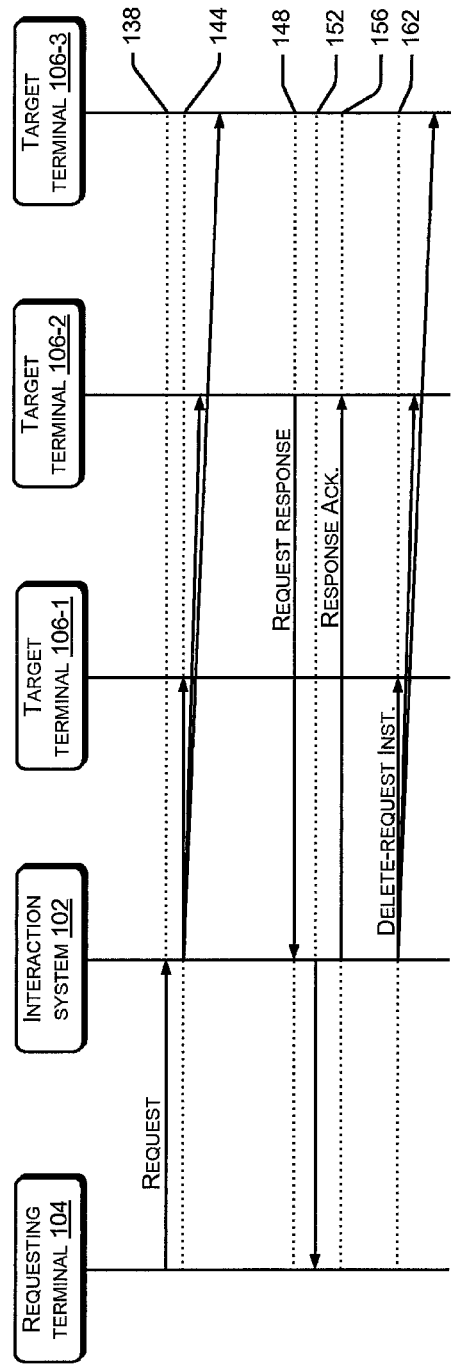
Figure 1(a)
Figure 1(b)

REAL-TIME INTERACTION IN A COMMUNICATION NETWORK

FIELD OF INVENTION

The present subject matter relates to communication networks and, particularly but not exclusively, to achieving a real-time interaction in the communication networks.

BACKGROUND

Advancing at a tremendous rate, technology has found its way into all walks of life. One such avenue remarkably affected by technology is social networking and interactions. In recent times, various social networking portals and applications have been developed, allowing users to communicate with each other. Such social networking portals usually invite users to build their network of friends and acquaintances over the social networking portal. The portals allow the users to exchange and propagate ideas and opinions with other users.

Generally, to use a social networking portal, a user creates a profile on the portal and logs on to the portal. The access of the portal to the user is generally authenticated by a passcode. Once aboard, the user can access profiles of other users and even exchange files over the portal.

SUMMARY

This summary is provided to introduce concepts related to real-time interaction in a communication network. This summary is not intended to identify essential features of the claimed subject matter nor is it directed to use in determining or limiting the scope of the claimed subject matter.

According to an implementation, a method for real-time interaction is described herein. In said implementation, the method includes determining a context feature associated with at least one request received from a requesting terminal. The request is transmitted in a service region based on the context feature. The request can be transmitted by broadcasting over a communication network. In response to the request, at least one request response is received from one or more of a plurality of target terminals, and the request response is provided to the requesting terminal.

According to another implementation, an interaction system for achieving real-time interactions is described. In said implementation, the interaction system includes a processor and a memory coupled to the processor. The memory includes an analysis engine configured to obtain a context feature associated with a request, the request being received from a requesting terminal. Additionally, the analysis engine is further configured to determine a service parameter associated with the context feature. The memory also includes a transmission module configured to broadcast the request in a service region to a plurality of target terminals, the service region being identified based on the context feature and the service parameter. The transmission module can be further configured to transmit at least one request response received from at least one target terminal to the requesting terminal, based on the service parameter.

According to yet another implementation, a target terminal participating in real-time interaction is described herein. In said implementation, the target terminal is configured to receive a request from an interaction system through a broadcast message. The request can include a context feature. The target terminal can determine, based on the context feature, whether the target terminal is an intended recipient of the request, and based on the determining, the target terminal can perform an action in response to the request. The action can be either transmitting a request response or rejecting the request.

According to yet another implementation, a computer-readable medium having embodied thereon a computer program for executing a method for achieving real-time interaction is described herein. In said implementation, the method includes obtaining at least one request from a requesting terminal, the request including a context feature and a service parameter. The request is broadcast to a plurality of target terminals in a service region within a serviced cell, based on the context feature and the service parameter. Further, at least one request response is received from one or more of the plurality of target terminals, in response to the at least one transmitted request. The request response is then provided to the requesting terminal based on the service parameter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1(a) illustrates a message flow diagram indicating real-time interaction in the communication network, according to an implementation of the present subject matter.

FIG. 1(b) illustrates a message flow diagram indicating real-time interaction in the communication network, according to another implementation of the present subject matter.

DESCRIPTION OF THE INVENTION

Figure 1:
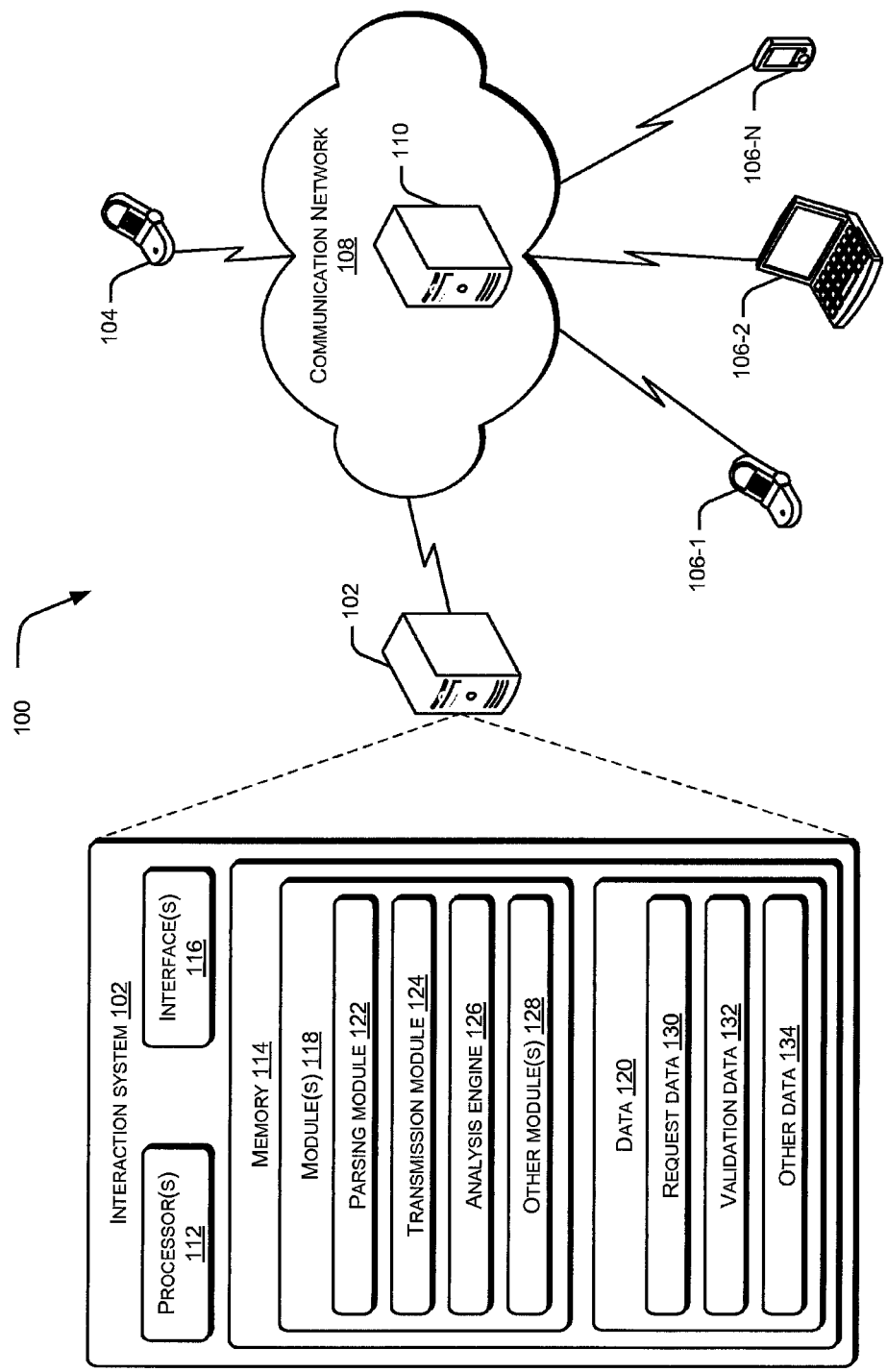
FIG. 1 illustrates a network implementation of an interaction system for real-time interaction in a communication network, according to an embodiment of the present subject matter.

Conventionally, user interactions are achieved through social networking portals and applications, and users can communicate with each other over a network servicing the portals. The identity of a user is usually authenticated before access of the portals is provided to the user. On few such portals, certain activities, such as sending messages to other users and accessing other users' account information, are also allowed based on authentication of the user.

In addition, few of the conventional social networking applications operate on location based services, which allow a user to disclose his or her location to a selected group of users, for example, users associated over the social networking portal. In turn, the user may also request information about the location of other users from the selected group. During such interactions between the users, the identities of all the users involved in the interactions are disclosed to each other, which may lead to security issues. For example, a rogue user, say a stalker or a thief, can get associated with another user by means of a fake account, and can track that user's whereabouts. Additionally, in certain conventional social networking applications, the information exchanged between various closed-group users is visible to all other users of the application, whether they are associated with the closed-group users or not. Such visibility of information to all the users can cause privacy issues for certain users.

Further, in the conventional social networking applications, the user accounts are more susceptible to attacks, such as hacking attacks, since the authenticated access can be manipulated. Furthermore, to be connected to other users of the social networking applications, large amount of data is continually exchanged by a social networking application with a server, for example, for providing an update of location of the user to a server. In order for the user to access the application at all times, tremendously large amounts of data is exchanged, which in turn, incurs huge data usage cost to the user. On the other hand, providing authentication details for logging on to the application each time is inconvenient for the users. In addition, the data relating to the users being updated at the server can also be accessed by, for example, a rogue user, and may lead to security and privacy issues.

The present subject matter relates to real-time interaction in a communication network. According to an implementation, a requesting terminal can send a request to an interaction system over the communication network. The interaction system, in turn, can transmit the request to a plurality of target terminals associated with the interaction system and invite responses to the request. The responses, also referred to as the request responses, received from the target terminals are collated by the interaction system and pushed to the requesting terminal.

In an implementation, the request sent by the requesting terminal to the interaction system is a question to which an answer is sought in real-time. For example, the requesting terminal may seek help in finding a route from one point to another point, or to know whether tickets for a movie at a specific movie theatre for a certain time slot are available or not. Further, according to an implementation, based on the request sent by the requesting terminal, the interaction system can determine a context feature associated with the request. In an implementation, the context feature can be associated with the request by the requesting terminal while sending the request. In another implementation, the request can be devoid of the context feature, and the interaction system can obtain the context feature either from the requesting terminal or based on previous interactions. In an example, the context feature can be the location of the movie theatre. In other examples, the context feature can additionally include the time and date, and a user category.

Additionally, in an implementation, the interaction system can determine one or more service parameters associated with the request, for example, related to transmission of the request. For example, the service parameters can include a range of area in the vicinity of the location specified in the context feature, referred to as a service region. The service parameters can also include a request response limit which defines a limit on the number of request responses that can be received. Additionally, the service parameters can include a timeout window, within which the request response is to be provided. It will be understood that the interaction system can determine the service parameters in the same manner as the context feature is determined.

The request from the requesting terminal may be received by the interaction system over a network that communicatively couples the requesting terminal and the interaction system. The interaction system may parse the request and forward the request to a plurality of target terminals, over the network. In an implementation, the interaction system can parse the request, verify content of the request, and identify a serviced cell of the network for sending the request. Further in an example, based on the location specified in the context feature, the interaction system may determine a base transceiver station (BTS) servicing the cell in which the location lies.

Further, according to an implementation, based on the service parameter, the interaction system can identify a service region in the serviced cell for transmitting the request. Accordingly, the BTS can transmit the request in that service region of the serviced cell, for a plurality of target terminals. In such a situation, the target terminals within the service region may receive the request and those outside the range may not receive the request. Further in an implementation, during the transmission of the requests, identity of the requesting terminal is not transmitted to the target terminals.

According to an implementation of the present subject matter, the interaction system is configured to broadcast the request from the requesting terminal in the determined cell. Hence, the interaction system sends a single request to multiple target terminals in the service region. In one example, the interaction system sends the request to a broadcast centre in the network, which can further broadcast the request in the service region, through the BTS.

As a result of the request being broadcast in the service region, updates of location of the requesting terminal or the target terminals to the interaction system are not required, which saves considerable amount of data usage of the terminals. Hence, according to the present subject matter, first there is a reduction in the flow of data from the terminals for updating the interaction system of the location. Additionally, as a result of broadcasting the requests, network operators may not charge the target terminals for the data download, since broadcast messages are usually free of charge. Further, the interaction system can have a simple architecture as the location and other parameters associated with the requesting and target terminals are not stored on the interaction system. Therefore, the infrastructural costs and the operational costs associated with the interaction system are substantially reduced.

According to an implementation, the request, before being broadcast, is tagged with a user category to which the requesting terminal belongs. For example, a requesting terminal having provided valid responses during previous interactions can be classified as a "trusted user" or a "privileged user". Accordingly, the requests received from such a user can be tagged with the user category. The tagged requests transmitted to the various target terminals can be identified as being sent by a credible user, and hence, can be used by the users of the target terminals for deciding whether to respond to the request or not.

Additionally, when the transmitted request is received at the target terminal, in an implementation, the target terminal can identify whether the request is intended for that target terminal or not. For example, in case the target terminal is outside the location mentioned in the request, then the target terminal would identify that the request is not intended for this terminal, based on the context feature, and may ignore and reject the request.

Further, the target terminals intended to receive the request may access the request and content of the request. In an example, if the request includes a question, a user of the target terminal may respond to the question and send a request response to the interaction system. Hence, the interaction system may receive multiple request responses from the target terminals. The interaction system may parse the request responses and check the content of the request responses for validity. Once the content is validated, the interaction system can push the request responses to the requesting terminal. In an implementation, the target terminals sending the request response can be levied a predefined amount of cost for sending the request response. Accordingly, the users of the target terminals can select whether to respond or not, and those responding can be charged. In another implementation, the cost of responding associated with the target terminals can be borne by the requesting terminal.

In an implementation, the transmission of the request responses to the requesting terminal can be governed by the service parameters. For example, if n is the request response limit, i.e., the limit of number of request responses to be sent, specified in the service parameter, then the interaction system can send the first n valid request responses to the requesting terminal. In another example, if the request response is received at the interaction system after expiry of the timeout window, specified in the service parameter, then the interaction system can be configured to reject that request response. In the latter case, such selective receipt of the response requests allows the requesting terminal to receive pertinent responses, which, say if received after the expiry of the timeout window, would be insignificant. For example, if the request is to seek information on availability of tickets for a movie show at 2.00 PM, then a response request received at 2.05 PM would be insignificant.

Further, in an implementation, the interaction system can transmit a delete-request instruction to the target terminals in the service region to delete a particular request, for example, after the expiry of the time-out window as the request is no longer valid, or after the requesting terminal has received a pertinent answer. In another implementation, the target terminals can determine whether the request is valid or not, based on, for example, the service parameters in the request, and delete the request in case the request is invalid.

Further, according to an implementation, in a similar manner as the requests are tagged, the interaction system can tag the request response from a target terminal belonging to a certain user category with that user category. For example, a target terminal providing credible and valid responses during previous interactions can be classified as a "trusted user" or a "privileged user", and a request response from such a user can be tagged with the user category. As a result, when the request response with such a tag is received by the requesting terminal, the authenticity, credibility, and accuracy of the information can be indicated by the tag.

In said implementation, the interaction system may transmit the request responses to the requesting terminal without transmitting the credentials associated with the responding target terminals. Since, as mentioned earlier, the anonymity of the requesting terminal is also maintained, the interaction between the requesting terminal and the target terminals are secure and provide privacy to both the interacting parties. In addition, the concealment of the identities of the requesting terminal and the target terminals allows an uninhibited interaction between a user of the requesting terminal and the users of the target terminals. Further, as will be understood from the foregoing description, the target terminals may be charged for responding to the request, but not for receiving the broadcast requests from the interaction system. Hence, the cost of data usage incurred by the users of the target terminals is considerably reduced. Additionally, the target terminals can receive the requests at all times and provide a response to the request, without the users of either of the two terminals having to authenticate the access. Such a capability facilitates a convenient and real-time interaction between the requesting terminal and the target terminals.

The manner in which the systems and methods for achieving real-time interactions in a communication network are implemented shall be explained in details with respect to the figures. While aspects of described systems and methods for achieving real-time interactions in a communication network can be implemented in any number of different computing systems, environments, and/or configurations, the embodiments are described in the context of the following exemplary system(s).

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

FIG. 1 illustrates a network environment 100 implementing an interaction system 102, according to an embodiment of the present subject matter. The interaction system 102 is configured to facilitate real-time interactions in the network environment 100. The interaction system 102 is connected to and interacts with a requesting terminals 104 and a plurality of target terminals 106-1, 106-2 . . . 106-N, collectively referred to as the target terminals 106 and individually referred to as the target terminal 106. The interaction system 102 may be implemented in a variety of computing systems, such as a laptop computer, a desktop computer, a notebook, a workstation, a mainframe computer, a server, and a network server. The requesting terminal 104 and the target terminals 106, on the other hand, can include, without limitation, desktop computers, hand-held devices, laptops or other portable computers, tablet personal computers, network computers, mobile phones, multi-media enabled phones, and smart phones.

The interaction system 102, the requesting terminal 104, and the target terminals 106 can communicate with each other over a communication network 108. The communication network 108 may be a wireless or a wired network, or a combination thereof. In an example, the communication network 108 can be implemented as a telecommunication network. In said example, the communication network 108 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). Depending on the technology, the communication network 108 includes various network entities, such as gateways, routers; however, such details have been omitted for the sake of brevity.

In another example, the communication network 108 can be implemented as a combination of the telecommunication network and a computer network. According to said example, the computer network can be implemented as one of the different types of networks, such as intranet, local area network (LAN), wide area network (WAN), and the internet. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), to communicate with each other. Further, the communication network 108 may include a variety of network devices, including routers, bridges, servers, computing devices, storage devices. In yet another example, the communication between the interaction system 102, and the requesting terminal 104 and the target terminals 106 can be partly achieved through General Packet Radio Service (GPRS) or Bluetooth.

Further, according to an implementation of the present subject matter, the communication network 108 can include a broadcast centre 110 coupled to the interaction system 102 over the communication network 108. It will be understood that the broadcast centre 110 can be a network entity of the telecommunication network and can be configured to transmit information in the form of broadcast messages. According to said implementation, the broadcast centre 110 can use short messaging service cell broadcast (SMSCB) protocol for broadcasting the information. In an example, the broadcast centre 110 can be implemented as a base station controllers (BSCs), a main switching center (MSC), a radio network controller (RNC), or a Gateway GPRS support node (GGSN), configured to broadcast information. Further, it will be understood that although the functionality of broadcasting is described with reference to the broadcast centre 110, the interaction system 102 can be configured to support the same functionality along with other functions. In such an embodiment, the interaction system 102 can be configured on the network entity of the communication network 108, or vice versa.

In an implementation, the interaction system 102 includes processor(s) 112 coupled to a memory 114. The interaction system 102 further includes interface(s) 116, for example, to facilitate communication with the requesting terminal 104 and the target terminals 106. The interface(s) 116 may include a variety of software and hardware interfaces, for example, interfaces for peripheral device(s), such as a keyboard, a mouse, an external memory, and a printer. Further, the interface(s) 116 enables the interaction system 102 to communicate with other devices, such as web servers and external repositories. The interface(s) 116 can also facilitate multiple communications within a wide variety of networks and protocol types, including wired networks, for example, LAN, cable, etc., and wireless networks, such as WLAN, cellular, or satellite. For the purpose, the interface(s) 116 may include one or more ports.

The processor(s) 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 are configured to fetch and execute computer-readable instructions stored in the memory 114.

The memory 114 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 114 includes module(s) 118 and data 120.

The module(s) 114 include, for example, a parsing module 122, a transmission module 124, an analysis engine 126, and other module(s) 128. The other module(s) 128 may include programs or coded instructions that supplement applications or functions performed by the interaction system 102.

The data 120 can include request data 130, validation data 132, and other data 134. The other data 134, amongst other things, may serve as a repository for storing data that is processed, received, or generated as a result of the execution of one or more modules in the module(s) 118. Although the data 120 is shown internal to the interaction system 102, it may be understood that the data 120 can reside in an external repository (not shown in the figure), which may be coupled to the interaction system 102. The interaction system 102 may communicate with the external repository through the interface(s) 116 to obtain information from the data 120.

In operation, as mentioned earlier, the interaction system 102 is configured to facilitate real-time interaction between the requesting terminal 104 and one or more target terminals 106. According to an implementation, the interaction system 102 receives one or more requests from the requesting terminal 104. The interaction system 102 transmits the request in a service region, which can be received by the target terminals 106. The service region, as will be explained later, may be understood as a region identified by the interaction system 102, based on each request, for transmitting the request. Subsequently, one or more of the target terminals 106 can each send a request response to the interaction system 102. The interaction system 102 can parse the request responses and, accordingly, forward the same to the requesting terminal 104.

The operation of the interaction system 102, and the interactions with the requesting terminal 104, the target terminals 106 and the broadcast centre 110, are explained with reference to FIG. 1, FIG. 1(a) and FIG. 1(b). FIG. 1(a) illustrates information flow diagram indicating real-time interactions, according to an implementation of the subject matter, in which the broadcast centre 110 is deployed separately from the interaction system 102. On the other hand, FIG. 1(b) illustrates the information flow diagram indicating the real-time interactions, according to another implementation of the subject matter, in which the functionality of the broadcast centre 110 are implemented in the interaction system 102.

The transmission of the request from the requesting terminal 104 to the interaction system 102 is indicated at step 136 and step 138, in FIG. 1(a) and FIG. 1(b), respectively. In an implementation, the request sent to the interaction system 102 can include a question for which the requesting terminal 104 is seeking an answer in real-time. For example, the requesting terminal 104 may seek help in identifying whether space is available at a certain restaurant at a certain time, or whether tickets for a certain movie are available at a movie hall for a certain show. In an example, the requesting terminal 104 can send the request to the interaction system 102 over the communication network 108 in the form of a hyper text transfer protocol (HTTP) request, a simple object access protocol (SOAP) request, a simple mail transfer protocol (SMTP) request, or in the form of a short messaging service (SMS) request. Accordingly, in an example, a charge associated with the sending of the request to the interaction system 102 can be determined based on the format of the request, and such charge can be levied to the requesting terminal 104.

According to an implementation, the request can include a context feature. The context feature, in an example, as the name suggests can set a context of the request. Say, the context feature can be a location of the movie theatre or the restaurant regarding which the requesting terminal 104 is seeking information. In other examples, the context feature can be a date, time, a selected user category, and interests, on the basis of which the context of the request can be set. As understood, according to said implementation, the requesting terminal 104 can send the context feature along with the request, and the analysis engine 126 can determine the context feature from the request.

In another implementation, the interaction system 102 can obtain the context feature associated with the request. In an example, the analysis engine 126 can be configured to prompt the requesting terminal 104 to provide the context feature for the received request. In another example, the analysis engine 126 can be configured to automatically determine the context feature associated with the request, based on the previous interactions between the interaction system 102 and the requesting terminal 104. In said example, the analysis engine 126 can further verify the identified context feature with the requesting terminal 104.

Further, in an implementation, based on the request, one or more service parameters can also be determined. It will be understood that, as explained with reference to the context feature, the service parameters can either be associated with the request by the requesting terminal 104 before sending the request, or may be determined by the analysis engine 126 of the interaction system 102 in a manner as explained with reference to the context feature. The service parameters can, in an example, be related to the transmission of the request from the interaction system 102 in the service region, and back to the requesting terminal 104. According to said example, the service parameters can include the service region, a request response limit, or a time-out window. In said example, the service region can be understood as a range of area in the vicinity of the location specified in the context feature; the request response limit can be understood as a limit of the number of request responses that can be received by the requesting terminal 104 in response to the request; and the time-out window can be understood as the time from the issuance of request, within which the request response should be received.

According to an implementation, upon the receipt of the request from the requesting terminal 104, the parsing module 122 of the interaction system 102 can parse the request. In an example, the parsing module 122 can validate the contents of the request and the syntax of the content of the request. Further, the request can be parsed by the parsing module 122 based on various validation rules and data in the validation data 132. Additionally, based on parsing achieved by the parsing module 122, the analysis engine 126 can determine the context feature associated with the request and the also the service parameters in the request. The analysis engine 126 can store the request, the associated context feature, and the service parameters in the request data 130. In another implementation of the present subject matter, the requesting terminal 104 can send the request along with the context feature to the interaction system 102, and the analysis engine 126 can provide questions relating to the context feature to the requesting terminal 104.

According to another implementation, upon receipt of the request, the analysis engine 126 can determine a location of the requesting terminal 104 based on, for example, the BTS servicing the requesting terminal 104. In said implementation, if the analysis engine 126 determines that the requesting terminal 104 lies within the service region in which the request is to be broadcast, then the analysis engine 126 can provide certain exclusive features to the requesting terminal 104. For example, in such a scenario, the requesting terminal 104 may be allowed to send requests and receive request responses free of charge.

Further, the interaction system 102 can broadcast the request based on the service parameters. For example, the analysis engine 126 of the interaction system 102 can identify the service region associated with the request in which the request is to be broadcast, based on the service parameters. In said example, the transmission module 124 can identify a serviced cell in which the service region lies and accordingly select a base transceiver station (BTS) for broadcasting the message. In an implementation, the transmission module 124 can be configured to tag the request with a user category before forwarding the request for transmission. In said implementation, the transmission module 124 can tag the request with a user category, such as "privileged user". The tag associated with the request can be indicative of credibility associated with the request.

For example, a movie theatre owner can request feedback about a movie and the services in the theatre, from the users after a movie is over. If such a request is tagged with a tag, say "Theatre Admin", then the crowd can decide whether they want to respond to it or not. In this example, the tagging of the request can be clubbed with offers, and so the owner of the theatre can provide special offers and rewards to the users from whom responses to such requests are received. In another example, after conclusion of a board meeting in a corporate entity, a broadcast can be made to determine whether the answers given by the management of the entity were useful. In said example, the request can be tagged as "Management feedback" and can request for a rating for the answers provided by the management.

As a result, a real time interaction between various users can be achieved, and the tagging of the request in such a scenario can help the users in making a decision as to whether the request should be responded to or not. For example, the request can be tagged as "trusted user" depicting that the request is coming from a user who has provided valid and accurate responses during earlier interactions. In such a case, the users to whom the request is posed, may be more inclined to respond because the request is coming from a "trusted user" who has been helpful during previous interactions.

Once the requests are tagged, in an implementation, the interaction system 102 can push the request to the broadcast centre 110, which further communicates with the BTS for broadcasting the message. Said implementation is indicated at step 140 in FIG. 1(a). In another implementation, as shown in FIG. 1(b), the interaction system 102 can directly broadcast the request in the service region through the BTS servicing the serviced cell as shown at step 144.

Upon broadcasting the message in the service region, shown as step 142 and 144 in FIG. 1(*a*) and FIG. 1(*b*), respectively, the request is received by all the target terminals in the service region. It will be understood that although the broadcast request is shown to reach the different target terminals 106-1, 106-2, and 106-3 at different instances, the request can reach the target terminals 106-1, 106-2, and 106-3 simultaneously. As a result of the request being broadcast to the target terminals 106-1, 106-2, and 106-3, updates of location of the requesting terminal 104 or the target terminals 106-1, 106-2, and 106-3 on the interaction system 102 for achieving the interactions are not required. As a result, a considerable amount of reduction of data usage of the terminals is achieved. Additionally, the interaction system 102 can be implemented as having a simple architecture since the interaction system 102 is not required to process and store large amounts of data. Therefore, the infrastructural costs and the operational costs associated with the interaction system 102 are substantially reduced.

In an implementation, when the request is received at each of the target terminals 106-1, 106-2, and 106-3, each target terminal 106 can identify whether that target terminal 106 is the intended recipient of the message or not. In said implementation, the target terminal 106 can identify itself being an intended recipient or not based on the context feature or the service parameter or both. For example, if the target terminal 106 is outside the service region in which the message is broadcast, then the target terminal 106 can reject the request. On the other hand, if the target terminal 106 determines that the request is intended for that target terminal 106, then the target terminal accepts the request and may provide the request to the user on a graphical user interface (GUI) associated with the target terminal 106.

In addition to requesting information from the target terminals, in an implementation, the requesting terminal 104 or a third party user can use the requests for advertising, without the target terminals 106-1, 106-2, and 106-3 having to pay for data download. In an example, in case a third party is using the requests for advertising, the interaction system 102 can be configured to levy the charges for data usage to the third party. Hence, the interaction system 102 can also facilitate advertising, in which the target terminals 106, or the target audience, are relieved of unnecessary expenses.

Since the request is broadcast to the target terminals 106-1, 106-2, and 106-3, the data flow from the requesting terminal 104 and the target terminals 106-1, 106-2, and 106-3 for updating the server with locations of the terminals 104 and 106 is considerably reduced. On the other hand, since the requests are broadcast in the service region, the target terminals 106-1, 106-2, and 106-3 are not charged for data download, because the reception of messages is provided free of cost by network operators.

Further, one or more of the target terminals 106-1, 106-2, and 106-3 can provide a request response to the interaction system 102. The request response, in an example, can be an answer to the question posted by the requesting terminal 104 in the request. As indicated in step 146 in FIG. 1(*a*) and in step 148 in FIG. 1(*b*), as an example, the target terminal 106-2 provides a request response to the interaction system 102. In the same manner as explained with reference to the request, the request response can be provided to the interaction system 102 in the form of a hyper text transfer protocol (HTTP) response, a simple object access protocol (SOAP) response, a simple mail transfer protocol (SMTP) response, or in the form of a short messaging service (SMS) response. Additionally, the charge levied on the target terminal 106-2 responding to the request can be determined based on the format of the response. In another example, the charge for responding to the request can be levied on the requesting terminal 104 seeking information.

Upon receipt of the request response at the interaction system 102, shown as step 146 in FIG. 1(*a*) and step 148 in FIG. 1(*b*), the parsing module 122 can parse the request response, say to check the request response for content and syntax. Further, according to an implementation, the parsing module 122 can validate the request response against the service parameters, stored earlier in the request data 130. For example, if n is the response request limit determined by the analysis module 126 as part of the service parameters, then the parsing module 122 can check whether received request response is within the response request limit or not. In case the request response is the $(n+1)^{th}$ or a later request response, then the parsing module 122 can reject the request response. In another example, if the request response is received by the interaction system 102 after the expiry of the time-out window, then the parsing module 122 can reject the request response.

On the other hand, if the parsing module 122 determines that the request response is valid with respect to the service parameters, say if the request response is received before the expiry of the time-out window, or is one of the first n request responses received by the interaction system 102, then the request response is transmitted to the requesting terminal 104.

As a result of the validity check exercised by the parsing module 122, for example, against the service parameters, the interaction system 102 receives and keeps those request responses which are relevant to the request and rejects the other response requests. For example, if a request is for obtaining information about availability of tickets for a certain movie screening, then the request response having such information and received after the commencement of that movie screening is irrelevant for the requesting terminal 104. Hence, the interaction system 102 facilitates real-time interactions between the requesting terminal 104 and the target terminals 106, which are useful to the user of the requesting terminal 104.

According to an implementation, upon the determination of whether the request response is valid or not, the transmission module 124 can send a response acknowledgement to the appropriate target terminal 106, which in this case is the target terminal 106-2. The transmission of the response acknowledgement from the transmission module 124 of the interaction system 102 to the target terminal 106-2 is indicated at step 154 in FIG. 1(*a*) and at step 156 in FIG. 1(*b*). In another implementation (not shown in figure), the acknowledgement response can be sent to the appropriate target terminal 106, upon receipt of the request response by the requesting terminal 104. It will be understood that in one implementation, the transmission module 124 can be configured to send a response rejection acknowledgement to each such target terminal 106 from which an invalid request response is received.

As mentioned earlier, in case the response request is determined to be valid, the transmission module 124 can transmit the response request to the requesting terminal 104. The transmission of the response request from the interaction system 102 to the requesting terminal 104 is depicted at step 150 in FIG. 1(*a*) and at step 152 in FIG. 1(*b*). Although in the aforementioned implementations, the transmission module 124 provides the response request to the requesting terminal 104 as and when the response request is received, in another implementation, the transmission module 124 may collate the various responses received and transmit the response requests in bulk after the expiry of the time-out window.

According to an implementation of the present subject matter, before pushing the request responses to the requesting terminal 104, the transmission module 124 can tag the request responses with a user category based on the target terminal 106-2 from which the request response is received. In an example, the tag associated with each request response can be indicative of an accuracy or credibility of that request response. Hence, based on the tag of the user category associated with the request responses, the requesting terminal 104 can determine whether the request responses are accurate or credible or not. For the purpose of identifying the target terminals 106 to be associated with a certain user category, the analysis engine 126 can also invite feedback on the request responses from the requesting terminal 106.

For example, a target terminal 106, from which mostly valid responses have been received during previous transactions and for which a positive feedback is received from the requesting terminal 106, can be marked as belonging to a user category named "trusted user". In said example, when the requesting terminal 104 receives the request response tagged as received from a trusted user, the user of the requesting terminal 104 can assume that the information in the request response is credible. Further, the interaction system 102 can conceal the identity of the target terminal 106 from which the response request is received, while forwarding the response request to the requesting terminal 104. As a result, the interactions achieved by the interaction system 102 provide security as well as privacy to the various users of the requesting terminal 104 and the target terminals 106.

On the contrary, the request responses tagged as belonging to certain other categories can be ignored by the user of the requesting terminal 104 or can have less weightage. Consider an example, in which the requesting terminal 104 sends a request to seek answers to a question "Is the 'X' movie good?" to a group of users of the target terminals 106 coming out of a movie theatre. In such a case, the response from a trusted user can be assumed to be substantially accurate. On the other hand, if the user category, say "Theatre Admin", associated with the response request indicates that the response could be from a user belonging to a category of owners of the movie theatre, then the user of the requesting terminal 104 may consider such a request response with a pinch of salt.

Further, according to an implementation, the transmission module 124 can be configured to monitor the service parameters, and based on the service parameter, the transmission module 124 can automatically generate a delete-request instruction and broadcast the delete-request instruction in the service region, in which the request was earlier broadcast. Upon the receipt of the delete-request instruction, the target terminals 106 can delete the request received from the interaction system 102. In another implementation, the target terminals 106 can be configured to determine validity of the request, based on the service parameter, such as the timeout window. Further, based on the validity of the request, the target terminal 106 can delete the request. In such a case, the transmission module 124 may not need to generate and transmit the delete-request instruction.

For example, the transmission module 124 can monitor whether the time-out window for receiving the response has expired or not, and when the time-window expires, the transmission module 124 can transmit the delete-request instruction. In another example, the transmission module 124 can monitor whether n valid request responses have been received by the interaction system 102, and upon the receipt of the $n^{th}$ valid request response, the transmission module 124 can broadcast the delete-request instruction. In yet another example, a user of the requesting terminal 104 may issue a stop-response input and send it to the interaction system 102, for instructing the interaction system 102 to not send anymore request responses. In said example, the requesting terminal 104 may have already received the required information and may not require anymore request responses. In such a situation, if the requesting terminal 104 has issued a stop-response request, the transmission module 124 can broadcast the delete-request instruction. It will be understood that, as explained earlier with reference to the broadcast of requests, the delete-request instruction can be broadcast either by the broadcast centre 110, as shown at step 158 and 160 of FIG. 1($a$), or by the interaction system 162, as shown at step 162 in FIG. 1($b$).

Figure 2:
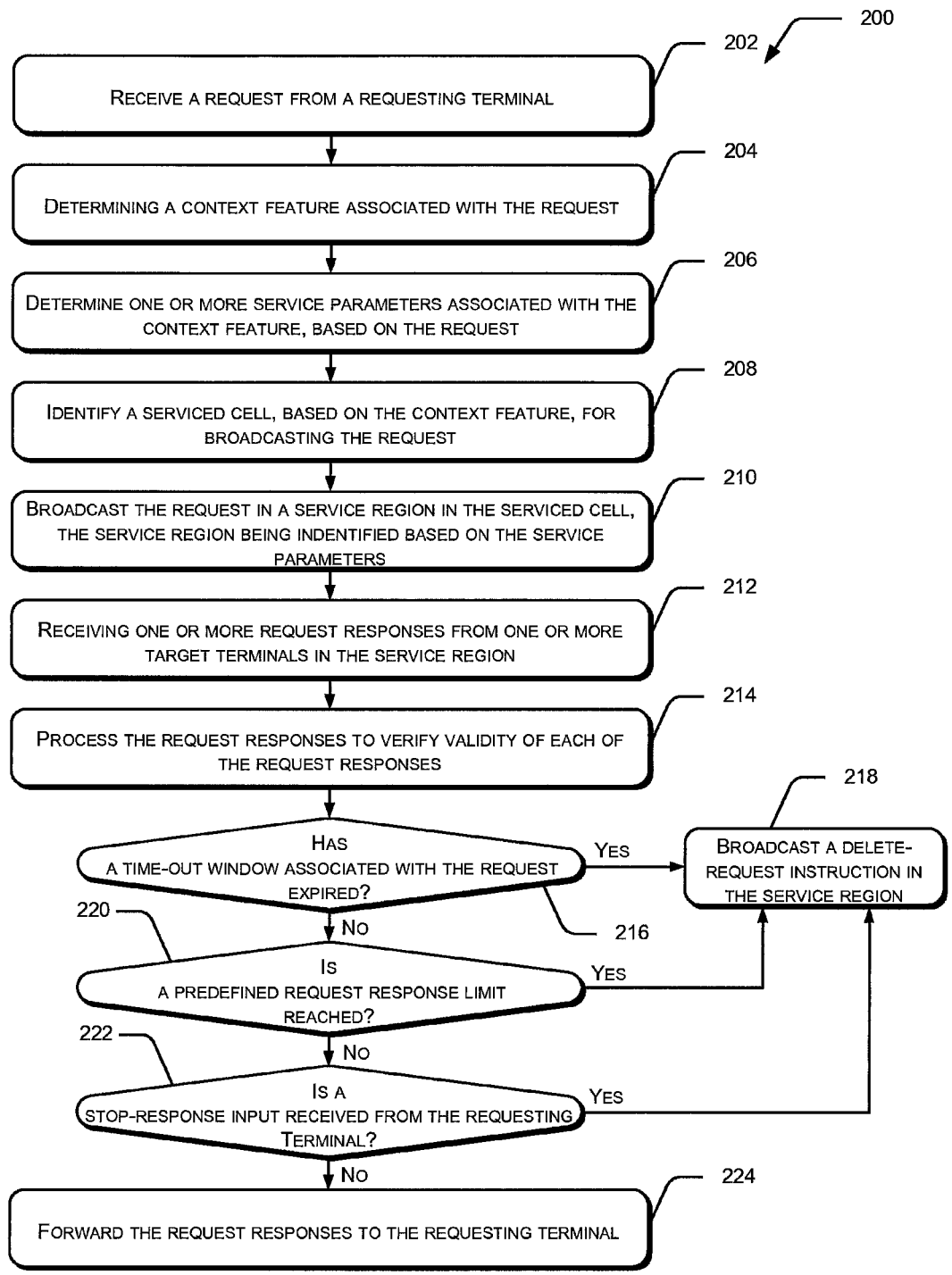
FIG. 2 illustrates a method for real-time interaction in a communication network, according to an embodiment of the present subject matter.

FIG. 2 illustrates a method 200 for real-time interactions in a communication network, according to an embodiment of the present subject matter. The order in which the method 200 is described is not intended to be construed as a limitation, and any number of the described method blocks can be combined in any order to implement the method 200, or alternative methods. Additionally, individual blocks may be deleted from the method without departing from the spirit and scope of the subject matter described herein. Furthermore, the methods can be implemented in any suitable hardware, software, firmware, or combination thereof.

A person skilled in the art will readily recognize that steps of the method 200 can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both, communication network and communication devices configured to perform said steps of the method 200.

Referring to block 202, a request is received from a requesting terminal, such as the requesting terminal 104. The request can be received by the interaction system 102.

According to an implementation, upon receipt of the request at the requesting terminal 104, the request is parsed for verifying whether the request is valid or not. For example, the request is parsed by the parsing module 122 based on the validation data 132. In an implementation, the request can be parsed to verify whether content or syntax, or both, of the request are valid or not. In case the content is invalid, say if the request is a hoax request and includes explicit language, or the syntax of the request is incorrect, then the request is rejected.

On the other hand, if the request is valid, then at block 204, a context feature associated with the request is determined. In an implementation, the requesting terminal 104 can associate the context feature with the request while sending the request to the interaction system 102. In such a case, in an example, the analysis engine 126 can determine the context feature associated with the request. In another implementation, the requesting terminal 104 can send a request to the interaction system 102, and the analysis engine 126 can determine the context feature associated with the request from that requesting terminal 104, say by sending a prompt to the requesting terminal to provide the context feature or based on previous interactions with that requesting terminal 104.

In an implementation, the request can be a question for which an answer is sought by the requesting terminal 104 in real-time. For example, the request can include a question to obtain feedback on a movie playing in a certain movie hall in real-time by people coming out of the movie hall after the movie, or a question to enquire in real-time, as to whether tickets for a certain play being staged in a theatre are available. In said implementation, the request can include a context feature which can provide a context to the request. For example, the context feature can be a location of the theatre or the movie hall, or a date or time or both for the movie or play for which information is sought.

At block 206, one or more service parameters associated with the context feature in the request are determined. In an implementation, the service parameters can include a service region, a response request limit, or a time-out window. The service region can be a region in a cell serviced by a network operator, in which the requesting terminal 104 may intend to transmit the request. The response request limit can be a limit on the number of responses to the request that the requesting terminal 104 may intend to receive. The timeout window can specify the time-limit within which the requesting terminal 104 may intend to receive the responses to the request. For example, in case a user of the requesting terminal is seeking information regarding the availability of movie tickets for a certain show, then the responses received after the commencement of the movie show can be understood to be irrelevant. Further, it will be understood that the service parameter associated with the context feature can be one of the above mentioned parameters or a combination thereof. In an example, the analysis engine 126 can determine the service parameters Further, a block 208, a serviced cell for broadcasting the request is identified, based on the context feature. In an example, the analysis engine 126 can identify a location specified in the context feature, and based on the location, the analysis engine 126 can identify the serviced cell for broadcasting the request.

In an implementation, the request, before being broadcast, can be tagged with a user category. In an example, based on the tag associated with the request, the recipient target terminals 106 can determine credibility of the request. The request can be tagged with a tag, say "trusted user" or "privileged user" indicating that the request is coming from a user who has been actively responding to previous requests and providing valid and useful information. In such a case, the target terminals 104 can decide on whether to respond to the request or not, based on the user category to which the user of the requesting terminal 104 belongs.

At block 210, the request is broadcast in a service region in the serviced cell. The service region may be identified based on the service parameters. In an example, the analysis engine 126 can determine the service region in the serviced cell, and the transmission module 124 can broadcast the request in the service region. According to an implementation, the transmission module 124 can send the request to the broadcast centre 110, along with the information of the service region in which the request is to be broadcast. The broadcast centre 110 can further broadcast the request, say via a base transceiver system (BTS) operating in the service region. In another implementation, the interaction system 102 can directly broadcast the request in the service region, say via the BTS.

Upon broadcasting the request in the service region, a single request is sent to a plurality of target terminals 106 in the service region. In an implementation, each of the target terminals 106 receiving the request determines whether that target terminal 106 is an intended recipient of the request, based on the context feature or the service parameter or both, or is the request erroneously received. In the latter case, the request is rejected by the target terminal 106. On the other hand, in the former case, the request is accepted and the user can provide an appropriate response to the request, in term of the information sought in the request.

In response to the request, at block 212, one or more request responses are received from one or more target terminals 106. In an implementation, the request responses can include an answer to the question posted in the request. According to an example, the request responses are received by the interaction system 102.

At block 214, each of the request responses are parsed to verify validity of the request responses. In example, the parsing module 122 can parse the request responses and verify whether the content of the each request response is valid or not. In said example, the parsing module 122 can ensure that the request responses that include explicit language or have erroneous syntax, are rejected.

Further, each of the request responses is checked for validity against the service parameters in the request. At block 216, it is determined whether the time-out window associated with the request has expired or not. In an example, the transmission module 124 is configured to assess the status of the time-out window expiry at block 216. In case the time-out window has expired ('Yes' path from block 216), then a delete-request instruction is broadcast in the service region at block 218. The delete-request instruction can be understood as an instruction issued to notify the target terminals 106 in the service region that the request is no longer valid and that the request responses received henceforth would be irrelevant.

On the other hand, if the time-out window has not expired ('No' path from block 216), then at block 220, it is determined whether the request response limit is reached or not. For example, if the request response limit specified in the service parameters is n, then upon receipt of the $n^{th}$ request response, a flag is raised that the request response limit is reached. In case the request response limit is reached ('Yes' path from block 220), then the delete-request instruction is broadcast in the service region at block 218.

Conversely, in case the request response limit is not reached ('No' path from block 220), then at block 222, it is determined whether a stop-response input is received from the requesting terminal 104. In one example, if the required information is already received in an earlier request response, or in case the user of the requesting terminal 104 has decided to discard the plan of the movie, then the user may send a stop-response input to the interaction system 102 to reject any further request responses. In an example, the analysis engine 126 can determine whether the stop-response input is received or not.

In case the stop-response input is received ('Yes' path from block 222), then the delete-request instruction is broadcast in the service region at block 218.

In another implementation, the target terminals 106 can be configured to determine the validity of the request, based on the service parameters. In case the request is invalid in light of the service parameters, then the target terminals 106 can delete the request.

On the other hand, if the stop-response input is not received ('No' path from block 222), then at block 224, the request response is sent to the requesting terminal 104. In an example, the transmission module 124 can send the request response to the requesting terminal 104.

According to an implementation, while transmitting the request response to the requesting terminal 104, the request response can be tagged with a user category based on the target terminal 106 from which the request response is received. The tag of the user category associated with the request responses can indicate accuracy or reliability of the request response, and accordingly the information in the response request can be further used.

Although implementations for real-time interactions in a communication network have been described in language specific to structural features and/or methods, it is to be understood that the appended claims are not necessarily limited to the specific features or methods described. Rather, the specific features and methods are disclosed as implementations for achieving real-time interactions in a communication network.

I claim:

1. A method for real-time interaction, the method comprising:
    determining a context feature associated with at least one request, the at least one request being received from a requesting terminal;
    transmitting the at least one request in a service region based on the context feature, the transmitting includes determining at least one service parameter associated with the context feature in the at least one request, wherein the at least one request is transmitted by broadcasting over a communication network;
    receiving at least one request response from one or more of a plurality of target terminals, in response to the at least one transmitted request; and
    providing the at least one request response to the requesting terminal wherein providing also comprises:
    tagging the at least one request response with a user category to determine an accuracy of the at least one request response;
    transmitting the at least one request response to the requesting terminal based on the service parameter; and
    transmitting a delete-request instruction to the plurality of target terminals, based on the at least one service parameter associated with the context feature.

2. The method as claimed in claim 1, wherein the at least one service parameter comprises at least one of a service region, a response request limit, and a time-out window.

3. An interaction system for real-time interaction, the interaction system comprising:
    a processor; and
    a memory coupled to the processor, the memory comprising,
        an analysis engine which obtains a context feature associated with a request, wherein the request is received from a requesting terminal, identify a serviced cell for broadcasting the request, based on the context feature, and determine a service parameter associated with the context feature; and
        a transmission module which broadcasts the request in a service region to a plurality of target terminals, wherein the service region is identified based on the context feature and the service parameter, transmit at least one request response received from at least one target terminal to the requesting terminal, based on the service parameter, tag the at least one request response with a user category to determine an accuracy of the at least one request response and broadcast a delete-request instruction to the plurality of target terminals, based on the service parameter.

4. The interaction system as claimed in claim 3, wherein the analyzer is further configured to:
    determine the service region in the serviced cell for broadcasting the request, based on the service parameter.

5. The interaction system as claimed in claim 4, wherein the transmitter is further configured to broadcast the request in the serviced cell.

6. The interaction system as claimed in claim 3, wherein the transmitter is further configured to transmit the request to a broadcast centre for broadcasting the request in the service region.

7. The interaction system as claimed in claim 3, further comprising a parser configured to validate content of the request and the at least one request response, prior to the broadcasting and the transmitting, respectively.

* * * * *